Nov. 2, 1926.  
G. CLAUDE  
1,605,646  
PROCESS OF SEPARATION OF GASES LIQUEFYING AT DIFFERENT TEMPERATURES  
Filed Jan. 30, 1920
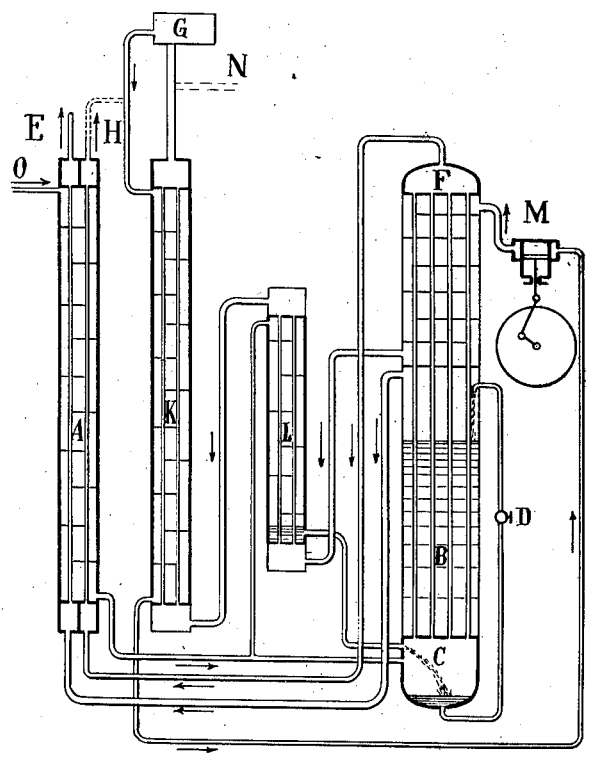
Georges Claude Inventor
By his Attorneys

Patented Nov. 2, 1926. 1,605,646

UNITED STATES PATENT OFFICE.

GEORGES CLAUDE, OF PARIS, FRANCE, ASSIGNOR, BY MESNE ASSIGNMENTS, TO LAZOTE INC., A CORPORATION OF DELAWARE.

PROCESS OF SEPARATION OF GASES LIQUEFYING AT DIFFERENT TEMPERATURES.

Application filed January 30, 1920, Serial No. 355,048, and in France February 10, 1914.

The present invention has for its object some improvements in processes of separating gases liquefying at very different temperatures, in which the more volatile element furnishes, by its expansion with the production of external work, the cold necessary for the purification of the gaseous residue from the mixture of gases treated.

Further objects and advantages of the invention will be apparent as it is better understood by reference to the following specification, when read in connection with the accompanying drawing diagrammatically illustrating an apparatus adapted for use in carrying out the invention.

A process directed to the general object is described in the French patent No. 329,839 of February 28, 1903, but it has the disadvantage that the more volatile element, hydrogen, in the case of water gas, arrives very cold at the expansion engine because of having circulated in heat interchanging relation with expanded hydrogen leaving this engine. Nevertheless, this circulation is necessary, as indicated in Patent No. 329,829, to insure complete purification of the mixture after it has already been partially separated by liquefaction in contact with the liquid formed by the more condensable element.

According to the present invention, I purpose to accomplish the desired purification by the cold of a difficultly liquefiable gas, leaving the engine, where it is expanded with the production of external recoverable work; but compressed hydrogen resulting from this purification is no longer sent directly to the expander and the difficultly liquefiable gas arrives at the expander warmer than is otherwise possible, thus increasing the efficiency of the expansion. With this in view, the water gas, for example, is compressed, cooled in the well known manner in one or more exchangers of temperature through which it passes in indirect contact with the cold gases, hydrogen and carbon monoxide, resulting from the separation. The gas, thus cooled, liquefies in passing, preferably from below upward, through a bundle of tubes or a coil immersed in liquid rich in carbon monoxide. Carbon monoxide in the mixture is partially liquefied and is conveyed to the exterior of the bundle and vaporized there on account of the liquefaction inside the tubes. There the unliquefied residue gives up carbon monoxide remaining therein by indirect contact with a very cold gas leaving the expander. It follows that very pure hydrogen is withdrawn from the apparatus, under the initial pressure of the water gas. To this cycle of liquefaction is added, the cycle for the production of supplemental cold, in which a difficultly liquefiable gas, such as hydrogen, is compressed, and subsequently cooled in an exchanger by cold portions of the same gas after expansion, and then sent to the expander. The expanded gas circulates about the gaseous mixture, rich in hydrogen, above referred to, to cause the final purification thereof, then passes into a liquefier, in which it liquefies a part of the water gas and continues to the exchanger. By reason of the provision of the liquefier, the expanded gas cannot excessively cool the gas entering the expander and the expansion can then be effected under the best conditions.

The drawing herewith represents, by way of example, one mode of applying my invention in the case of liquefaction of water gas, it being understood that no attempt has been made to illustrate details of construction and that various changes may be made in the apparatus employed without departing from the spirit of the invention. The previously compressed gas passes by a pipe O to an exchanger of temperature A, where it meets evaporated carbon monoxide and hydrogen under pressure, both resulting from the separation. In leaving the exchanger A, the water gas is delivered at the foot of the tubular bundle B, of which the lower part is surrounded by liquid carbon monoxide and the upper part is cooled by extremely cold expanded gas leaving the expansion machine M. In the ascendant circulation through the bundle B, the water gas gives up its carbon monoxide, which falls in the state of liquid to the collector C from which it is delivered to the exterior of the bundle by the cock D; while the water gas in the interior of the bundle is thus partially liquefied. The carbon monoxide at the exterior of the bundle evaporates and is withdrawn through an outlet E, after having traversed the exchanger A, where it gives up its cold to the water gas entering through O. Arriving at the upper part of the bundle B, the water gas is further robbed of carbon monoxide and substantially pure hydrogen leaves at F. The maximum purity for this hydrogen is reached when the temperature of the cold expanded gas surrounding the upper part of the bundle is lowest. The hydrogen thus separated is under pressure when leaving the apparatus at H, after giving up its cold in the exchanger A to the entering water gas.

To provide the cold necessary to the operation of the apparatus, a compressor G compresses a difficultly liquefiable gas, such as hydrogen, and delivers it to an exchanger K; from which the gas passes to the expander M for expansion with external work, which produces a notably low temperature; that is the low temperature which is utilized in the upper part of the bundle to ensure the purification of the hydrogen manufactured, by liquefying, in the interior of the tubes, the carbon monoxide in the water gas. The expanded hydrogen, after having circulated about the upper part of the bundle B passes to a liquefier L fed by a part of the water gas which leaves the exchanger of temperature A. It produces the partial liquefaction of this water gas, and the liquid formed is delivered into the collector C; it is this liquid which provides the additional cold necessary to the continued operation of the apparatus. The expanded hydrogen returns then to the exchanger K where, after having given up its cold to the entering hydrogen, it is withdrawn by the compressor G for reuse.

It is to be noted that, in the case where there is no desire to utilize the hydrogen manufactured, in a compressed condition, the hydrogen may be directed into the exchanger K with that passing from the compressor G, the delivery of which will be reduced accordingly. The hydrogen, constituting the product of the apparatus, will be, in this case, withdrawn at N upon leaving the exchanger K, as shown by dotted lines in the accompanying drawing. It could be arranged for large apparatus so that the compressor G will not be necessary, the hydrogen, under pressure, leaving the exchanger A and alone entering the exchanger K.

I claim:

1. Process of separating gaseous mixtures, the constituents of which liquefy at very different temperatures, for example, in the recovery of hydrogen by partial liquefaction of water gas, which comprises subjecting the compressed and cooled gaseous mixture to selective liquefaction by heat interchange by indirect contact successively with the more readily liquefiable constituents of the mixture and with a colder expanded gas which is independent of the gaseous mixture under separation.

2. Process of separating gaseous mixtures, the constituents of which liquefy at very different temperatures, for example, in the recovery of hydrogen by partial liquefaction of water gas, which comprises subjecting the compressed and cooled gaseous mixture to selective liquefaction by heat interchange by indirect contact successively with the more readily liquefiable constituents of the mixture and with a colder expanded difficultly liquefiable gas which is independent of the gaseous mixture under separation.

3. Process of separating gaseous mixtures, the constituents of which liquefy at very different temperatures, for example, in the recovery of hydrogen by partial liquefaction of water gas, which comprises subjecting the compressed and cooled gaseous mixture to selective liquefaction by heat interchange by indirect contact with a colder expanded gas which is independent of the gaseous mixture under separation and afterwards circulating this expanded gas for heat interchange in indirect contact with a portion of the compressed and cooled gaseous mixture.

4. Process of separating gaseous mixtures, the constituents of which liquefy at very different temperatures, for example, in the recovery of hydrogen by partial liquefaction of water gas, which comprises circulating in a separate cycle a difficultly liquefiable gas, cooling it while under pressure, expanding it, circulating this cold expanded gas for heat interchange in indirect contact with the compressed and cooled gaseous mixture after circulation of this mixture for heat interchange in indirect contact with the more liquefiable constituents of the mixture.

5. Process of separating gaseous mixtures, the constituents of which liquefy at very different temperatures, for example, in the recovery of hydrogen by partial liquefaction of water gas, which comprises circulating in a separate cycle a difficultly liquefiable gas, cooling it while under pressure, expanding it, circulating this cold expanded gas for heat interchange in indirect contact with the compressed and cooled gaseous mixture after circulation of this mixture for heat interchange in indirect contact with the more liquefiable constituents of the mixture, then further circulating this partly reheated expanded gas for heat interchange in indirect contact with part of the compressed and cooled gaseous mixture and further reheating it by indirect contact with the same incoming compressed gas.

6. Process of separating gaseous mixtures, the constituents of which liquefy at very different temperatures, for example, in the recovery of hydrogen by partial liquefaction of water gas, which comprises subjecting the compressed and cooled gaseous mixture to heat interchange by indirect contact with a colder expanded gas which is of the same nature as the difficultly liquefiable gas separated by the liquefaction process and which circulates independently of the gaseous mixture under separation.

7. Process of separating gaseous mixtures, the constituents of which liquefy at very different temperatures, for example, in the recovery of hydrogen by partial liquefaction of water gas, which comprises introducing the difficultly liquefiable gas separated by the liquefaction process to a cycle producing cold for the liquefaction process by expansion of an identical difficultly liquefiable gas.

8. Process of separating gaseous mixtures, the constituents of which liquefy at very different temperatures, for example, in the recovery of hydrogen by partial liquefaction of water gas, which comprises introducing the difficultly liquefiable gas separated by the liquefaction process under the initial pressure to a cycle producing cold for the liquefaction process by expansion of an identical difficultly liquefiable gas and collecting part of the expanded difficultly liquefiable gas.

In testimony whereof, I affix my signature.

GEORGES CLAUDE.